United States Patent [19]

Robinson

[11] Patent Number: 4,651,466
[45] Date of Patent: Mar. 24, 1987

[54] GARDEN BED FRAME

[75] Inventor: Edward N. Robinson, Shelburne, Vt.

[73] Assignee: Danform Agencies, Inc., Shelburne, Vt.

[21] Appl. No.: 762,060

[22] Filed: Aug. 2, 1985

[51] Int. Cl.⁴ ............................................. A01G 9/00
[52] U.S. Cl. ......................................... 47/19; 47/26
[58] Field of Search .................... 47/18, 19, 20, 22, 26, 47/28, 28.1, 29, 31, 2, 46; 135/101, 102, 113, 116, 115; 248/500, 505, 510

[56] References Cited

U.S. PATENT DOCUMENTS

| | | | |
|---|---|---|---|
| 1,300,245 | 4/1919 | Bussey | 47/19 |
| 2,649,102 | 8/1953 | McDonough | 47/26 |
| 2,883,676 | 4/1959 | Kwake | 47/28 |
| 3,066,445 | 12/1962 | D'Amico | 47/28 |
| 3,206,892 | 9/1965 | Telkes et al. | 47/29 |
| 3,251,069 | 5/1966 | Clark | 24/336 |
| 3,372,740 | 3/1968 | Kastovich et al. | 47/17 |
| 4,301,618 | 11/1981 | August | 47/46 |

FOREIGN PATENT DOCUMENTS 553641 1/1957 Belgium ................................. 47/19

Primary Examiner—James R. Feyrer
Assistant Examiner—Bradley M. Lewis
Attorney, Agent, or Firm—Berman, Aisenberg & Platt

[57] ABSTRACT

A frame for a garden bed collects and stores solar heat energy and transmits the energy to soil within a garden bed. Hollow frame members contain a heat storage medium such as water or a water antifreeze mixture. A variety of structures, including a clear plastic cover or a trellis, may be erected above the present frame. An electric immersion heat supplements solar heat energy to further warm the garden bed soil.

2 Claims, 6 Drawing Figures

GARDEN BED FRAME

TECHNICAL FIELD

The present invention relates to a frame for a garden bed, and more particularly to a frame including hollow members that are filled with a heat storage medium. The hollow members collect and store solar heat energy and transmit this energy to the garden soil.

BACKGROUND OF THE INVENTION

Proper soil temperature is critical to insure seed germination in a garden bed. Seeds of most garden plants require a minimum nighttime temperature of about 68 degrees Fahrenheit for at least three to fourteen and up to twenty-one days to germinate. Commercial growers have moved their farms to the South and West in order to better guarantee favorable soil temperatures during the critical germination period. Backyard gardeners throughout the rest of the country have several options. They may plant seed and hope for proper soil temperatures, buy "started" plants for transplanting, or use expensive and cumbersome greenhouses and window boxes to create proper germination conditions. Seeds will not germinate when soil is not maintained at the critical temperature and may even rot if planted in soil which is too cool.

Soil temperature also is important during the late stages of the growing season. The leaves and unripened fruit of garden plants can be protected from frost damage by plastic 'tents', but the plants will not continue to produce when the soil temperature drops below a critical temperature. Thus, devices which warm garden soil can increase plant production by extending the growing season into the autumn months when soil temperature normally drops too low.

Raised garden beds have previously been constructed from boards or heavy logs nailed together or railroad ties. These beds are difficult to assemble and disassemble from year to year and thus, when left in place, require the gardener to prepare the soil by hand. Raised beds are desirable, however, because they exhibit good drainage and do not require the gardener to bend over as far when tending the plants.

Cold frames have been used for many years to protect young plants from damaging spring frosts. Cold frames usually consist of a low-lying frame of wooden boards and a glass cover. Although cold frames insure warm daytime temperatures, they often do not significantly insulate the soil to prevent the nighttime soil temperature from dropping below the critical seed germination temperature. U.S. Pat. No. 4,429,489 (Fischer) discloses a cold frame including sidewall panels and a cover. The sidewall panels are hollow and serve to insulate the garden bed from temperature extremes, but do not collect and store solar energy.

The hot bed is another device which is often used to enhance early season growth of garden plants. Hot beds include side panels, a glass roof and an internal source of heat such as fermenting manure. If the fermentation reaction or other source of heat fails, seeds planted in the hot bed may not be sufficiently warmed and may fail to germinate. Other structures and devices which are directed to the maintenance of proper growing environments include a greenhouse having hot water pipes for warming soil (U.S. Pat. No. 4,309,843); a greenhouse having a passive solar heating system (U.S. Pat. No. 4,244,148); insulated plant containers (U.S. Pat. Nos. 3,158,957; 4,395,486; and 4,016,676); and a device comprising a pool of water in which plant pots are floated (U.S. Pat. No. 4,041,641).

SUMMARY OF THE INVENTION

The present invention provides an inexpensive and very successful solution to the problem of insuring proper soil temperature during the critical seed germination period and the late growing season. The present frame for a garden bed includes hollow side members which contain a heat storage medium for collecting solar energy. The medium is preferably a liquid and the side members include sealable apertures for filling and draining. Brackets are mounted along the outer edges of the side members and support either a cover of shade netting or transparent plastic, or a trellis for supporting climbing vines.

In a preferred embodiment, side frame members contain water (or a mixture of water and ethylene glycol if freezing temperatures are likely) and operate as passive solar collectors. During daylight hours, sunlight strikes the side members, is converted to heat energy, and is stored within the liquid heat storage medium. The stored heat energy is transferred to the garden bed soil at night and during cloudy periods to help insure that the desired soil warmth is maintained. The frame can be manufactured in a variety of suitable dimensions, and an alternate embodiment includes an electric immersion heater for further warming the heat storage medium.

It is an object of the present invention to provide a frame for a garden bed wherein frame members include a heat storage medium.

Another object of the present invention is to provide a frame for a garden bed wherein frame members are passive solar collectors and store solar heat energy in a heat storage medium. Yet another object of the present invention is to provide a frame for a garden bed which is easily assembled and disassembled.

A further object of the present invention is to provide a frame for a garden bed wherein heat energy collected by passive solar collectors is supplemented by an electric immersion heater.

DETAILED DESCRIPTION

Figure 1:
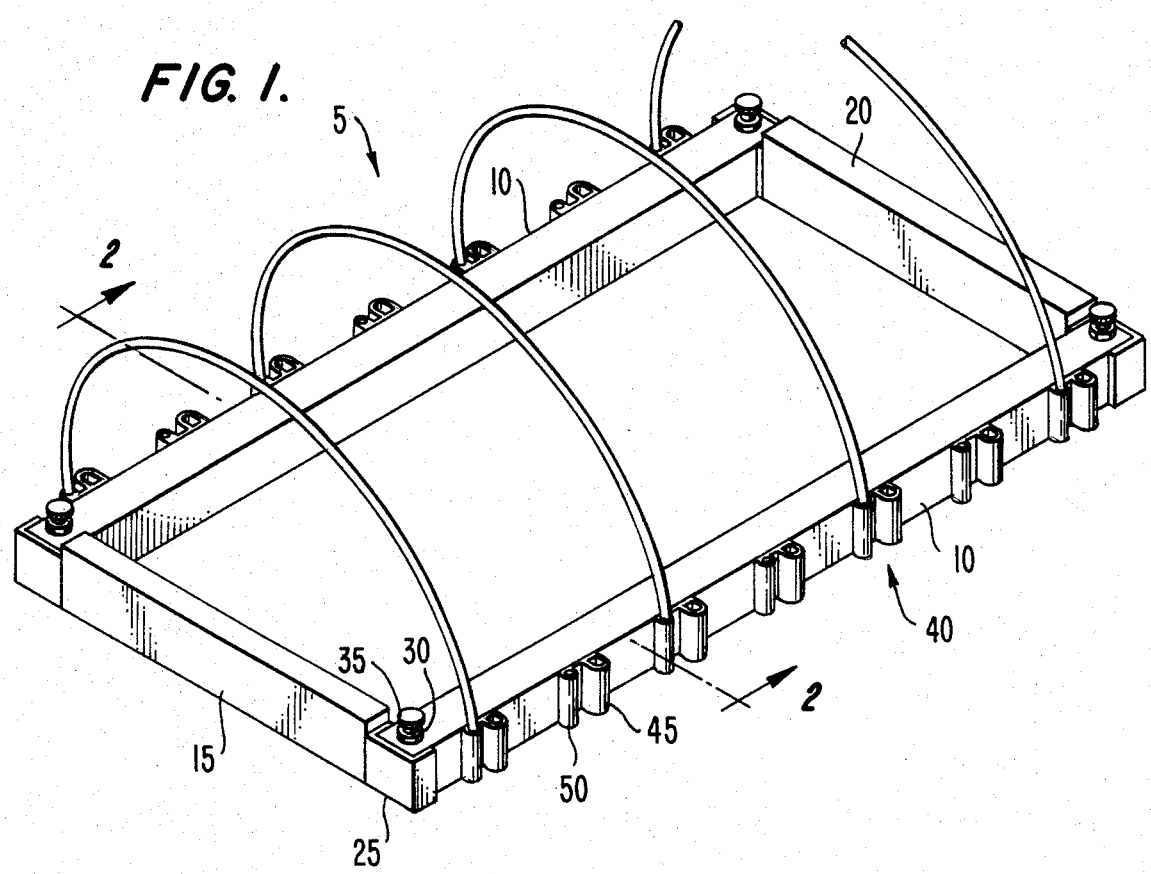
FIG. 1 is a perspective view of a preferred embodiment of the frame.

Referring now to FIG. 1, the present frame for a garden bed is illustrated and designated generally by reference numeral 5. Frame 5 is constructed of two side members 10, a front member 15 and a rear member 20. The front and rear members 15, 20 include shoulder portions 25 adapted to engage and retain ends of the side members 10 to form a rigid rectangular frame.

In this preferred embodiment, side members 10 are hollow and act as solar energy collectors. The interior portion of each side member forms a water tight chamber 27 (FIG. 2) for containing a heat storage medium.

The chambers 27 of side members 10 are filled and drained via ports 30 drilled in the tops of the side members. Plugs 35 seal the heat retaining medium within the side members. The front and rear members 15, 20 may be similar to the side members 10, or, as illustrated in FIG. 1, may simply be of solid construction.

As seen in FIG. 1, a plurality of brackets 40 are disposed along the outer longitudinal walls of the side members 10. Each bracket 40 includes two sockets for mounting a variety of support structures to the frame 5. The wide socket 45 is dimensioned to receive a one inch diameter pole 70 and the narrow socket 50 is dimensioned to receive a thinner (one-quarter inch diameter) wire hoop. The hoop and pole supports are useful for supporting shade netting for shading delicate plants and transparent plastic sheeting for creating a greenhouse environment over the bed. When growing vine-like plants, such as cucumbers, melons, beans, squash and peas, a trellis constructed of rigid poles and nylon or wire netting is installed in the brackets to permit these plants to climb upwards along the netting. This saves garden space, makes harvesting easier and reduces disease.

Figure 2:
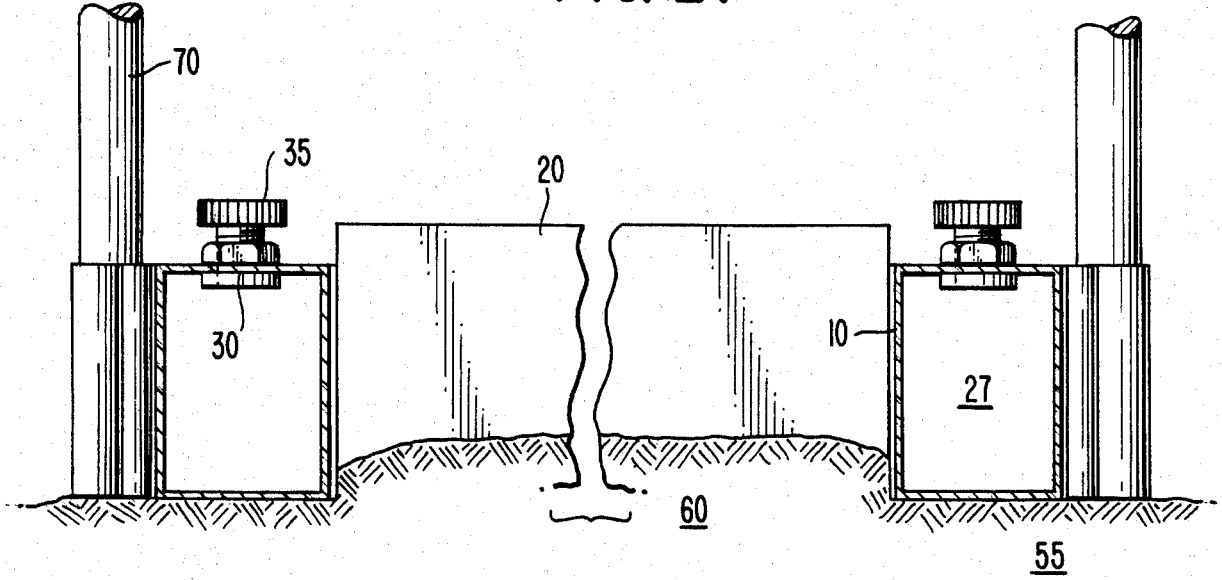
FIG. 2 is a cross-section taken along line 2—2 of FIG. 1.

As seen in FIG. 2, the present invention is especially useful for framing a raised garden bed. The frame members rest on level ground 55. The frame 5 encloses the soil 60 of the raised bed so that the soil 60 is in intimate contact with side members 10. Many gardeners prefer to cover their garden beds with a layer of black plastic to aid weed control. If the soil is covered with plastic before the frame is in place, the frame members effectively anchor the plastic to the ground.

To install the present invention in a garden, the garden soil is first tilled, plowed and harrowed, or dug and raked level. The frame members are set in place and the shoulder portions 25 are pressed over the ends of the side members 10. Additional soil 60 is then placed within the frame and raked level. Alternatively, the frame 5 may be assembled over a previously plowed raised bed. The chambers 27 of side members 10 are filled with a heat storage medium, preferably water, by removing all plugs 35 and pouring the water into the chambers through one of the ports 30 in each side member. Air which is displaced by the water exits the other port 30 in each side member. The plugs 35 are replaced after the chambers 27 are filled to capacity.

The side members 10 operate as passive solar collectors. Solar energy striking the side members 10 is stored as heat energy by the heat storage medium. Although some of the stored heat is transferred to the garden soil 60 during the day, the most important function of the side members is to warm the garden soil at night and during cloudy periods. Tests have shown that the present frame can increase nighttime garden soil temperature by up to 10 degrees compared to frames constructed of wooden planks. The added soil warmth provided by the present frame insures quicker and more successful seed germination and allows the backyard gardener to start his own seedlings each year. The expense of purchasing young "started" plants is avoided and the garden may take advantage of the wide variety of seeds which are available.

In addition to enhancing seed germination and the survival of seedlings, the present frame also is useful for protecting mature plants from last summer or early autumn frosts. Once the young seedlings have sufficiently matured, the lightweight and easily disassembled frame can be removed from the garden bed during the mid-summer months. Prior to the first early frost warnings, the present device may be again erected around the raised garden and filled with a water and antifreeze (e.g., ethylene glycol) mixture. Production of fragile vegetables such as beans, tomatoes, and cucumbers usually ceases with the first heavy autumn frost. The present frame with a clear plastic cover protects against early frost, and beneficially warms the garden bed soil to permit such vegetables to be produced throughout much of the autumn and possibly into the early winter.

Figure 3:
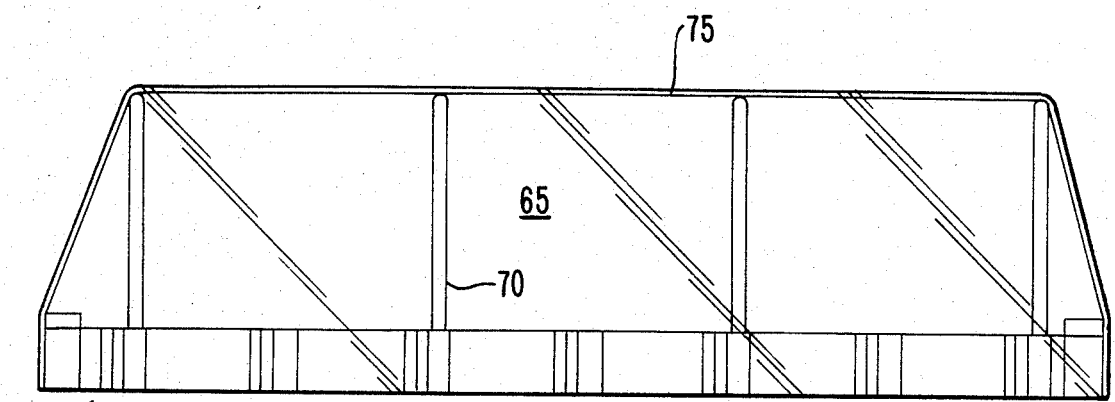
FIG. 3 is a side view of an alternate embodiment of the frame.
Figure 5:
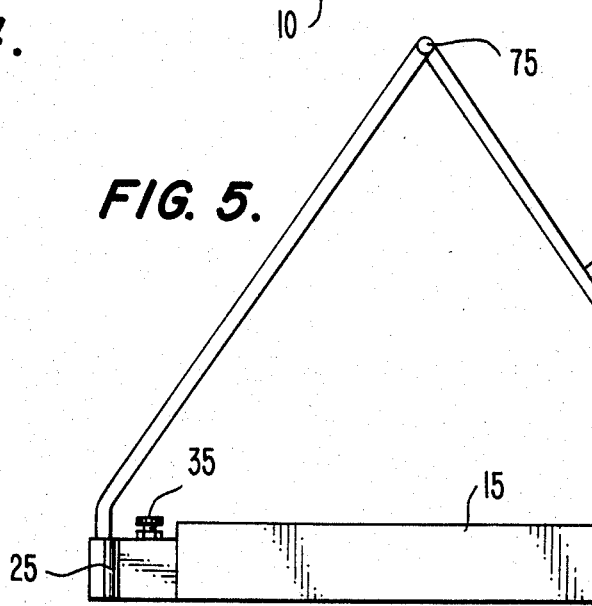
FIG. 5 is an end view of the frame of FIG. 3.

FIGS. 3 and 5 illustrate the present frame and a clear plastic cover 65. The plastic cover 65 is supported by a support structure which includes rigid poles 70 and a ridge pole 75. Although plastic covers for garden beds are not per se new, such a cover is particularly useful with the present solar collecting frame. At night, heat stored in the side members 10 and transmitted to the garden soil 60 is retained in the garden bed by the plastic cover 65.

Figure 4:
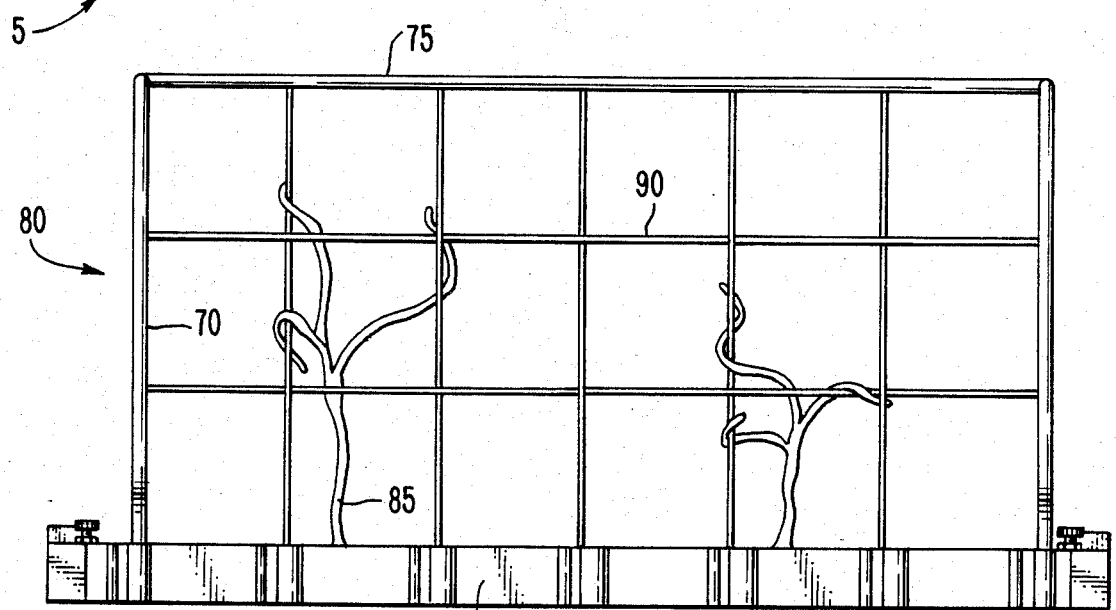
FIG. 4 is a side view of an alternate embodiment of the frame.

FIG. 4 illustrates the present frame and a trellis 80 for supporting climbing vines 85. The trellis 80 includes rigid poles 70 and a ridge pole 75. Ropes 90 are strung from poles 70 and 75 in a cross-wise manner to provide a support structure for the climbing vines. In other embodiments, ropes 90 are replaced by a trellis constructed of rigid tubular members.

Figure 6:
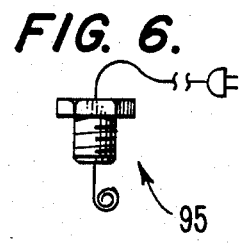
FIG. 6 is a side view of an electric immersion heater.

FIG. 6 illustrates an electric immersion heater 95 which is adapted to be secured into the filling ports 30 of side members 10 for plugs 35. Heat generated by heater 95 is useful for supplementing collected solar energy during the very early and late portions of the growing season. Immersion heater 95 allows many plants varieties to continue producing far beyond their normal seasons. A thermostat (not shown) can be used along with the immersion heater 95 to regulate the temperature of the heat storage medium within side members 10.

The present device is also useful for framing a compost pile. Compost piles of hay, straw, leaves and garden residue are built in the fall and allowed to sit throughout the winter. By the next Spring, decayed organic materials form a useful soil supplement. The exothermic compost reaction runs at about 140 degrees Farenheit, and the present frame is useful for insulating the compost pile from much lower outside temperatures.

Thus, there has been described a frame for a garden bed wherein side frame members contain a heat storage medium. The side members operate as passive solar collectors to absorb solar energy and store energy as heat. During daytime hours, but especially during nighttime hours and cloudy periods, the stored heat is transmitted to the garden bed soil to promote seed germination early in the growing season and to encourage prolonged production late into the season.

In the preferred embodiment, the side members are constructed of galvanized sheet metal and measured seven feet long by six inches high by three inches wide. The front and rear members are three and one-half feet long, seven inches high and, if constructed of sheet metal, are approximately one-sixteenth inch wide. The front and rear members also may be constructed of one and one-half inch wide wooden boards.

Variations of the invention within the scope of the appended claims will be apparent to those of skill in the art.

What is claimed is:

1. Brackets means for attachment to a frame for a garden bed, said bracket means consisting of a plurality of socket means, at least two of said plurality of socket means forming sockets of different diameters, for sliding engagement of an end of one of alternative support means respectively of said different diameters, said bracket means being of substantially rigid material, and said alternative support means being adapted to alternative coverings of different materials, for extending the growing season for plants planted within the frame of the garden bed.

2. In a frame for a garden bed comprising frame members for retaining soil, support members for supporting coverings for the garden bed, and a plurality of bracket means attached to said frame members, for sliding engagement of support members, the improvement wherein each of said bracket means is substantially rigid and consists of a plurality of socket means forming respective sockets of different diameters for sliding engagement of an end of a respectively-sized, support member, wherein a smaller diameter support member is slidingly engaged in a smaller diameter socket or, alternatively, a larger diameter support member is slidingly engaged in a larger diameter socket, and said support members are adapted to support alternative coverings for the garden bed, extending the growing season for plants planted within the garden bed.

* * * * *